(12) United States Patent
Nishikawa et al.

(10) Patent No.: US 7,354,968 B2
(45) Date of Patent: Apr. 8, 2008

(54) THERMOPLASTIC RESIN COMPOSITION

(75) Inventors: Tetsuo Nishikawa, Hofu (JP); Kazuo Haruta, Yamaguchi (JP); Toshiaki Sakaki, Kakogawa (JP); Tetsuo Mizoguchi, Nishinomiya (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 1179 days.

(21) Appl. No.: 09/973,646

(22) Filed: Oct. 9, 2001

(65) Prior Publication Data
US 2003/0069344 A1  Apr. 10, 2003

(51) Int. Cl.
*C08K 3/08* (2006.01)

(52) U.S. Cl. .................... 524/440; 524/420; 524/423; 524/431; 524/432; 524/439; 524/441

(58) Field of Classification Search ........... 524/440, 524/577, 571, 505, 420, 423, 431, 432, 439, 524/441
See application file for complete search history.

(56) References Cited

U.S. PATENT DOCUMENTS

| | | | | |
|---|---|---|---|---|
| 4,267,096 A | * | 5/1981 | Bussink et al. | 524/505 |
| 4,692,152 A | * | 9/1987 | Emde | 604/164.01 |
| 4,698,059 A | * | 10/1987 | Johnson | 604/270 |
| 4,780,981 A | * | 11/1988 | Hayward et al. | 43/44.89 |
| 5,786,416 A | * | 7/1998 | Gardner et al. | 524/440 |
| 5,908,884 A | * | 6/1999 | Kawamura et al. | 523/136 |
| 6,048,379 A | * | 4/2000 | Bray et al. | 75/229 |
| 6,300,399 B1 | * | 10/2001 | Gallucci et al. | 524/398 |
| 6,364,422 B1 | * | 4/2002 | Sakaki et al. | 301/5.21 |
| 2005/0211930 A1 | * | 9/2005 | DeMeo et al. | 250/516.1 |

FOREIGN PATENT DOCUMENTS

JP  2000-290466  10/2000

* cited by examiner

*Primary Examiner*—Edward J. Cain
(74) *Attorney, Agent, or Firm*—Flynn, Thiel, Boutell & Tanis, P.C.

(57) ABSTRACT

The present invention provides a thermoplastic resin composition having a high specific gravity, flexibility and excellent processability that can be used as a material for forming various articles requiring both massiveness and flexibility. This thermoplastic resin composition contains 2.5 to 15 wt % of a styrene-based thermoplastic elastomer and 85 to 97.5 wt % of tungsten powder, and an molded article is obtained by melting and kneading this thermoplastic resin composition. This article can be used preferably as a balance weight attached to a wheel of an automobile, sports goods or the like.

6 Claims, No Drawings

THERMOPLASTIC RESIN COMPOSITION

BACKGROUND OF THE INVENTION

1. Field of the Invention

The present invention relates to a thermoplastic resin composition that provides a molded article having a high specific gravity and an excellent flexibility, and molded articles obtained by using the composition.

2. Description of the Related Art

Polymer materials are easy to process and excellent in corrosion resistance, compared with metallic materials. In addition, polymer materials are light and comparatively inexpensive, and have excellent insulation properties, so that they recently have been used widely in many fields as raw materials or structural materials for electrical and electronic parts, machine parts, precision parts, general industrial parts and the like.

Moreover, polymer materials are excellent in processability, compared with metallic materials that require a cutting process, a sintering process or the like. In particular, when molded by injection molding, articles having a complex shape advantageously can be molded by only one process.

Regarding a balance weight mounted on a wheel in order to adjust a wheel balance of an automobile or the like, it is preferable that the balance weight is as small as possible so as not to spoil the appearance of the wheel. It is also desirable that the balance weight is easy to shape so as to fit the rim diameter of the wheel. Conventionally, as a material that satisfies these conditions, lead, which is a metallic material having a high specific gravity and an excellent flexibility, has been used as a material for forming the balance weight.

However, lead is toxic, and moreover, lead that has entered a human body from the skin and deposited in bones is very difficult to discharge and accumulates in the body. If lead is accumulated in a human body, lead poisoning may occur. Therefore, it is preferable to use a material other than lead to form the balance weight for a wheel as described above. However, at present, there is no such material having a high specific gravity and an appropriate flexibility as lead.

SUMMARY OF THE INVENTION

Therefore, it is an object of the present invention to provide a molded article that is highly flexible and excellent in processability while having a specific gravity as high as lead and that can be used as a material for forming various kinds of articles requiring both massiveness and flexibility such as a balance weight as described above by using a thermoplastic resin, which is a polymer material. It is also an object of the present invention to provide a thermoplastic resin composition that can be formed into the molded article.

The present invention provides a molded article of a thermoplastic resin composition having a high specific gravity, flexibility and an excellent processability by preparing a thermoplastic resin composition obtained by blending 2.5 to 15 percentage by weight (wt %) of thermoplastic elastomer and 85 to 97.5 wt % of tungsten powder, and molding the same.

DESCRIPTION OF THE PREFERRED EMBODIMENT

The thermoplastic elastomer used in the present invention is a resin containing a rubber component having elasticity (soft segment) and a molecule-constraining component for preventing plastic deformation (hard segment) in its molecules. The thermoplastic elastomer is a polymer material that behaves like rubber at room temperature, because the molecular motion of the soft segment is locally constrained by the hard segment but that is plastically deformed by an increase in temperature. The thermoplastic elastomer is plasticized at a high temperature and becomes moldable, whereas at room temperature, the thermoplastic elastomer retains its shape and can be deformed easily.

More specifically, examples of the thermoplastic elastomer include a styrene-based thermoplastic elastomer containing polystyrene as the hard segment and (hydrogenated) polybutadiene or (hydrogenated) polyisoprene as the soft segment; an olefin-based thermoplastic elastomer containing polyethylene or polypropylene as the hard segment and ethylene-propylene-diene copolymer (EPDM) or isobutylene-isoprene rubber as the soft segment; a polyester-based thermoplastic elastomer containing polyester as the hard segment and polyether or aliphatic polyester as the soft segment; an urethane-based thermoplastic elastomer containing a urethane bonding as the hard segment and polyether or polyester as the soft segment; and a polyamide-based thermoplastic elastomer containing polyamide as the hard segment and polyether or polyester as the soft segment.

It is also possible to use a 1,2-polybutadiene-based thermoplastic elastomer containing syndiotactic 1,2-polybutadiene as the hard segment and amorphous polybutadiene as the soft segment; a trans 1,4-polyisoprene-based thermoplastic elastomer containing trans 1,4-polyisoprene as the hard segment and amorphous polyisoprene as the soft segment; ionomer containing metal carboxylate ion cluster as the hard segment and amorphous polyethylene as the soft segment; a PE/EEA, EVA-based thermoplastic elastomer containing crystalline polyethylene as the hard segment and ethylene-ethylacrylate copolymer or ethylene-vinyl acetate copolymer as the soft segment; and a fluorine-based thermoplastic elastomer containing fluororesin as the hard segment and fluorine-based rubber as the soft segment. It is possible to use one kind of thermoplastic elastomer alone or two or more kinds in combination.

The thermoplastic elastomer used in the invention has to be excellent in weather resistance and aging resistance, in view of its use outdoors. For example, if the thermoplastic elastomer is used as a material for a balance weight mounted on a wheel of an automobile whose temperature rises to about 100° C., the thermoplastic elastomer is further required to be heat resistant so as not to be molten at about 100° C. In order to satisfy these requirements, it is desirable that the thermoplastic elastomer does not have a double bond and is not hydrolyzed. More specifically, a hydrogenated styrene-based thermoplastic elastomer which is produced by hydrogenating the polyisoprene moiety or the polybutadiene moiety constituting the soft segment of the styrene-based thermoplastic elastomer (SEPS and SEBS respectively) is suitable. Alternatively, it is also possible to use a hydrogenated styrene-based thermoplastic elastomer containing a unit of butadiene in the isoprene moiety. It is possible to use two or more different kinds of hydrogenated styrene-based thermoplastic elastomers in combination, such as SEPS and SEBS.

For example, in the case of the above-described SEPS, the physical properties may change, depending on the styrene content, the molecular weight of isoprene, the molecular weight distribution or the like. More specifically, the SEPS becomes hard as the styrene content is increased, and its strength is increased as the molecular weight of isoprene is increased. The moldability of the SEPS is reduced as its molecular weight distribution becomes sharp. In particular, when the molecular weight of isoprene is large and its molecular weight distribution is sharp, molding of the SEPS is extremely difficult. Regarding the styrene content, about 10 to 65% is generally used. However, for the SEPS used in the present invention, a suitable styrene content is 13 to 30%, preferably about 13 to 20%. Moreover, regarding the melt-flowability of the SEPS, in the case of injection molding, it is preferable that the MFR of the SEPS is 0.05 g/10 min. or more, more preferably 0.5 g/10 min or more, and even more preferably 1 g/10 min or more at 230° C. and 2.16 kg. This is because by blending tungsten powder, the moldability is reduced, compared with using a thermoplastic elastomer alone. On the other hand, in the case of extrusion molding, it is preferable that the MFR of the SEPS is 1 g/10 min or less under the same conditions because the moldability of the thermoplastic resin composition can be improved.

The styrene-based thermoplastic elastomer as described above is prepared by, for example, the following methods: preparing a block copolymer by living polymerization of styrene, isoprene and styrene or styrene, butadiene and styrene in this order using a monofunctional initiator such as alkyl lithium (three-step polymerization with a monofunctional initiator) and then performing hydrogenation; or preparing a block copolymer by living polymerization with the same monofunctional initiator in the same manner and coupling with alkyl dihalide (two-step polymerization by coupling), and then performing hydrogenation. The thermoplastic elastomer used in the present invention can be in the form of pellets or powder.

It is desirable that the tungsten used in the present invention is in the form of powder, because it is required to be blended uniformly with the thermoplastic elastomer. The average particle diameter of the tungsten powder is preferably 300 μm or less, more preferably 2 to 100 μm, even more preferably 3 to 30 μm and most preferably 3 to 27 μm. This is because, if the average particle diameter of the tungsten powder is large, the thermoplastic resin composition is difficult to pass through a mold gate and therefore the moldability is reduced when being molded by injection molding. On the other hand, if the average particle diameter of the tungsten powder is too small, the surface area of the tungsten powder is so large that a predetermined amount of thermoplastic elastomer cannot cover the surface of the tungsten powder completely. It is preferable to use tungsten powder of a small average particle diameter and tungsten powder of a large average particle diameter in combination, because the flowability of the thermoplastic resin composition is improved and the moldability becomes good when being molded by injection molding. When using two types in combination, it is preferable to use tungsten powder having an average particle diameter of 5 μm or less and tungsten powder having an average particle diameter of 27 μm or more.

It is also preferable to subject the tungsten powder used in the present invention to a coupling treatment in order to increase its affinity with the resin. Titanate-based, aluminum-based, silane-based coupling agents or the like can be preferably used. In particular, a silane-based coupling agent is preferably used in the present invention, because it improves affinity to the highest extent.

It is necessary that the content of the thermoplastic elastomer in the composition of the present invention is 2.5 wt % or more. If the thermoplastic elastomer content in the composition is less than 2.5 wt %, formation of the resin composition is difficult. Even if it can be formed, the moldability of the resin composition is poor. Moreover, the external appearance of a molded article made from the resin composition does not become neat It is preferable that a molded article obtained with the thermoplastic resin composition of the present invention has a surface hardness of 80 or less, more preferably 60 or less, when measured by the method defined in JIS K-7215 (testing machine type D).

It is also necessary that the content of tungsten powder in the composition is 85 wt % or more. This is because if the content of tungsten powder is less than 85 wt %, the specific gravity of the composition is less than 4.5, which is not sufficient.

Therefore, in order to satisfy the processability (moldability) of the thermoplastic resin composition and obtain a molded article having a high specific gravity, an excellent flexibility and an excellent processability, the content of the thermoplastic elastomer and the tungsten are 2.5 to 15 wt % and 85 to 97.5 wt % respectively.

If the molded article of the present invention is used as a balance weight of a wheel, sports goods or the like, the specific gravity of the molded article is preferably 8 or more, more preferably 9 or more and even more preferably 10 or more. In order to ensure the above specific gravities, the blending amounts of the tungsten powder are 93.5 wt % or more, 94.5 wt % or more and 95.5 wt % or more respectively. On the other hand, the blending amount of the thermoplastic elastomer necessary to ensure the flexibility required for these applications (as flexible as to be easily bent by hand) is 2.5 wt % or more, preferably 3.0 wt % or more, and even more preferably 4.0 wt %. Therefore, in these applications such as the balance weight, it is preferable to set the blending amount of the thermoplastic elastomer within the range of 2.5 to 6.5 wt % and the blending amount of the tungsten powder within the range of 98.5 to 97.5 wt %.

It is also possible to add, if necessary, to the thermoplastic resin composition of the present invention a non-lead metal or a non-lead metal composition within a range that does not inhibit the effect of the present invention. Examples of the nonlead metal includes steel, stainless steel, brass, copper, aluminum, nickel, silver, zinc, or the like. Examples of the non-lead metal composition includes iron oxide, copper oxide, aluminum oxide, barium sulfate, zinc oxide, molybdenum sulfide, or the like.

Furthermore, it is also possible to add to the thermoplastic resin composition of the present invention conventional additives such as antioxidants, thermal stabilizers, ultraviolet absorbers, antistatic agents, crystallization accelerators, coupling agents, lubricants, additive stickers (such as silicone oil), pigments, dyes, softening agents, antioxidants, crosslinking agents or the like as well as rubber or low molecular weight components, if necessary, within a range that does not inhibit the effect of the present invention.

The crosslinking agents are used to crosslink the thermoplastic elastomers, if necessary. The crosslinking agents serve to strengthen the binding among the thermoplastic elastomers and improve resistance against abrasion or damage to a higher extent than compositions with uncrosslinked elastomer. Examples of crosslinking agents include organic peroxides such as 2,5-dimethyl-2,5-t-butyl peroxyl-3-hexyne, 2,5-dimethyl-2,5-di-t-butylperoxyhexane, di(t-butylperoxy)-m-diisopropylbenzene, di-t-butyl peroxide, dicumyl peroxide, t-butylcumyl peroxide, t-butyl peroxycumene or the like.

The thermoplastic resin composition of the present invention contains tungsten powder and thermoplastic elastomer in the above-described ratio, and if necessary, contains the additives as described above. Furthermore, the thermoplastic resin composition of the present invention may be in the form of powders, pellets, chips, flakes or the like obtained by various kinds of well-known methods such as melt kneading using a single or a double screw extruder. In addition, molded articles of the present invention can be obtained by melt-kneading the above-described compositions blended in the above-described ratio or by melting the thermoplastic resin composition formed into the above-described forms of powders, pellets, chips, flakes or the like and molding the thermoplastic resin composition by various well-known methods such as extrusion molding, injection molding, compression molding or the like.

The thermoplastic elastomer having a flexibility at room temperature and an excellent moldability and the tungsten powder having a high specific gravity are blended to constitute the thermoplastic resin composition of the present invention. Therefore, the obtained molded articles have an appropriate flexibility while having a specific gravity as high as or higher than that of lead. In particular, the thermoplastic resin composition of the present invention can be used as a substitute for a balance weight made of toxic lead, and can also be used for various applications such as sports goods, electrical and electronic parts, machine parts and the like.

The thermoplastic resin composition of the present invention has excellent moldability and processability because of the use of the thermoplastic elastomer, and it is possible to use various kinds of molding processes including extrusion molding, injection molding and compression molding. Furthermore, the thermoplastic resin composition of the present invention can be recycled. In other words, the present invention has the advantage that the used thermoplastic resin composition of the present invention can be regenerated and reused by being collected, melted and molded.

EXAMPLES

Hereinafter, the present invention will be described by way of examples. However, the present invention is not limited to these examples. Before referring to the examples, a method for treating tungsten powder with a silane-based coupling agent will be described.

As the silane-based coupling agent, γ-(2-aminoethyl) aminopropyl trimethoxy silane (SH6020, manufactured by Dow Corning Toray Silicone Co., Ltd.) was used. First, 0.3 wt % of the silane-based coupling agent was dropped into tungsten powder being stirred in a mixer with a high speed stirring blade (super mixer) and the mixture was continuously stirred until the temperature in the mixer reached 120° C. Thereafter, the mixture was cooled and treated tungsten powder was obtained.

Example 1

As shown in Table 1, 3.0 wt % of a hydrogenated styrene-based thermoplastic elastomer (SEPTON 2063 (manufactured by Kuraray Co., Ltd.), which is a SEPS having a styrene content of 13 wt %, a specific gravity of 0.89, a JIS A hardness of 36, a number-average molecular weight of $1.56 \times 10^5$ and $4.08 \times 10^4$ at two peaks (peaks measured by GPC)) and 97 wt % of tungsten powder having an average particle diameter of 13 μm (manufactured by Tokyo Tungsten Co., Ltd.) that had been subjected to a coupling treatment in the above-described manner were blended and premixed by a mixer with a high speed stirring blade (super mixer). Then, melt-kneading was performed with a single screw extruder having a screw diameter of 25 mm and pellets were obtained. The pellets were heated (80° C.) and dried under reduced pressure, and a molded article of a rectangular solid having a length of 100 mm, a width of 25 mm and a thickness of 2.0 mm was obtained by an injection molding machine. The temperature of the injection molding machine was 240° C. and the temperature of the mold was 60° C. The melt flow rate (MFR) of the obtained pellets was 2.2 g/10 min. at 230° C. and a load of 2.16 kg.

Example 2

As shown in Table 1, a molded article of the same size was obtained by the same method as in Example 1 except that the pellets were obtained by blending 4.5 wt % of a hydrogenated styrene-based thermoplastic elastomer (SEPTON 4033 (manufactured by Kuraray Co., Ltd.)), which is a SEPS having a styrene content of 30 wt %, a specific gravity of 0.92, a JIS A hardness of 76, a number-average molecular weight of $8.79 \times 10^4$) and 95.5 wt % of tungsten powder having an average particle diameter of 13 μm (manufactured by Tokyo Tungsten Co., Ltd.) that had been subjected to a coupling treatment in the above-described manner and that the temperature for injection molding was 280° C. The MFR of the obtained pellets was 0 g/10 min at 230° C. and a load of 2.16 kg.

Example 3

As shown in Table 1, a molded article of the same size was obtained by the same method as in Example 1 except that 14.0 wt % of a hydrogenated styrene-based thermoplastic elastomer (SEPTON 2063 (manufactured by Kuraray Co., Ltd.)) and 86.0 wt % of tungsten powder having an average particle diameter of 5 μm (manufactured by Tokyo Tungsten Co., Ltd.) that had been subjected to a coupling treatment in the above-described manner were blended.

Example 4

As shown in Table 1, a molded article of the same size by the same method as in Example 3 was obtained except that SEPTON 4033 was used as the thermoplastic elastomer, tungsten powder having an average particle diameter of 3 μm was used and that the temperature for injection molding was 260° C.

Example 5

A molded article of the same size by the same method as in Example 1 was obtained except that a mixture obtained by blending tungsten powder having an average particle diameter of 5 μm and tungsten powder having an average particle diameter of 27 μm in a blending ratio of 6:4 was used as the tungsten powder.

Comparative Example 1

As shown in Table 1, 2.0 wt % of a hydrogenated styrene-based thermoplastic elastomer (SEPTON 2063 (manufactured by Kuraray Co., Ltd.)) and 98.0 wt % of tungsten powder having an average particle diameter of 13 μm (manufactured by Tokyo Tungsten Co., Ltd.) that had been subjected to a coupling treatment in the above-described manner were blended and premixed in the same manner as in Example 1, and then it was attempted to perform melt-kneading with a single screw extruder. However, the load to the extruder was so large that pellets could not be obtained.

Comparative Example 2

As shown in Table 1, a molded article of the same size was obtained by the same method as in Example 1 except that 18.0 wt % of a hydrogenated styrene-based thermoplastic elastomer (SEPTON 2063 (manufactured by Kuraray Co., Ltd.)) and 82.0 wt % of tungsten powder having an average particle diameter of 5 μm (manufactured by Tokyo Tungsten Co., Ltd.) that had been subjected to a coupling treatment in the above-described manner were blended.

Comparative Example 3

As shown in Table 1, a molded article of the same size was obtained by the same method as in Comparative Example 2 except that SEPTON 4033 was used as the thermoplastic elastomer and that the temperature for injection molding was 260° C.

Comparative Example 4

As shown in Table 1, a molded article of the same size was obtained by the same method as in Example 1 except that 5.7 wt % of Nylon 6 (MC 102 manufactured by Kanebo Gohsen, Ltd.) and 94.3 wt % of tungsten powder having an average particle diameter of 13 μm (manufactured by Tokyo Tungsten Co., Ltd.) that had been subjected to a coupling treatment in the above-described manner were blended and that the temperature for injection molding was 260° C.

TABLE 1

| | Composition | | | |
|---|---|---|---|---|
| | Resin component | | Tungsten powder | |
| | type | Blending amount (wt %) | average particle diameter (μm) | blending amount (wt %) |
| Ex. 1 | thermoplastic elastomer (SEPTON 2063) | 3.0 | 13 | 97.0 |
| Ex. 2 | thermoplastic elastomer (SEPTON 4033) | 4.5 | 13 | 95.5 |
| Ex. 3 | thermoplastic elastomer (SEPTON 2063) | 14.0 | 5 | 86.0 |
| Ex. 4 | thermoplastic elastomer (SEPTON 4033) | 14.0 | 3 | 86.0 |
| Ex. 5 | thermoplastic elastomer (SEPTON 2063) | 3.0 | 5 / 27 | 58.2 / 38.8 |
| Com. Ex. 1 | thermoplastic elastomer (SEPTON 2063) | 2.0 | 13 | 98.0 |
| Com. Ex. 2 | thermoplastic elastomer (SEPTON 2063) | 18.0 | 5 | 82.0 |
| Com. Ex. 3 | thermoplastic elastomer (SEPTON 4033) | 18.0 | 5 | 82.0 |
| Com. Ex. 4 | thermoplastic plastic (Nylon 6) | 5.7 | 13 | 94.3 |

The specific gravity and the surface hardness of the molded articles of Examples 1 to 4 and Comparative Examples 1 to 4 were measured, and the results are shown in Table 2. The measurement of the specific gravity and of the surface hardness was conducted by the method defined in JIS K-7112 and JIS K-7215 (type D of testing machine measuring durometer hardness), respectively.

TABLE 2

| | Physical properties | |
|---|---|---|
| | Specific gravity | Surface hardness |
| Ex. 1 | 11.9 | 25 |
| Ex. 2 | 9.9 | 55 |
| Ex. 3 | 5.0 | 8 |
| Ex. 4 | 5.1 | 40 |
| Ex. 5 | 11.9 | 25 |
| Com. Ex. 1 | — | — |
| Com. Ex. 2 | 4.0 | 5 |
| Com. Ex. 3 | 4.2 | 40 |
| Com. Ex. 4 | 10.1 | 90 |

As shown in Tables 1 and 2, the molded articles of Examples 1 to 5 having a content of thermoplastic elastomer in the range of 2.5 to 15 wt % and a blending amount of tungsten powder in the range of 85 to 97.5 wt % have a sufficient flexibility (surface hardness of 60 or less) although having a large specific gravity (4.5 or more). On the other hand, in the molded articles of Comparative Examples 2 and 3 containing 18.0 wt % of thermoplastic elastomer and 82.0 wt % of tungsten powder, contents that are outside of the above ranges, a sufficient specific gravity cannot be provided. In the case of Comparative Example 4 where Nylon 6 was used instead of the thermoplastic elastomer, there is the problem that the hardness is too high although the specific gravity is sufficient.

Furthermore, the molded articles of Examples 1 and 3 using SEPTON 2063 as the thermoplastic elastomer have a surface hardness of 25 or less and have an excellent flexibility. Therefore, when an excellent flexibility is required, it is desirable to use a flexible thermoplastic elastomer. A molded article with better flexibility than with SEPTON 4033 can be obtained with SEPTON 2063.

Regarding the tungsten powder, Example 5 containing tungsten powder of a small diameter and tungsten powder of a large diameter in combination advantageously has good moldability because the flowability of the resin is excellent although it is equal to Example 1 in the physical properties.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A thermoplastic resin composition comprising 2.5 to 6.5 wt. % of a styrene-based elastomer and 93.5 to 97.5 wt. % of tungsten powder.

2. A thermoplastic resin molded article comprising 2.5 to 6.5 wt. % of a styrene-based elastomer and 93.5 to 97.5 wt. % of tungsten powder.

3. A thermoplastic resin molded article consisting essentially of 2.5 to 6.5 wt. % of a styrene-based elastomer, 93.5 to 97.5 wt. % of tungsten powder and, optionally, at least one member selected from the group consisting of steel, brass, copper, aluminum, nickel, silver, zinc, iron oxide, copper oxide, aluminum oxide, barium sulfate, zinc oxide and molybdenum sulfide.

4. A thermoplastic resin composition consisting of 2.5 to 15 wt. % of a styrene-based thermoplastic elastomer and 85 to 97.5 wt. % of tungsten powder.

5. A thermoplastic resin molded article consisting of 2.5 to 15 wt. % of a styrene-based thermoplastic elastomer and 85 to 97.5 wt. % of tungsten powder.

6. A thermoplastic resin molded article consisting of 2.5 to 15 wt. % of a styrene-based thermoplastic elastomer, 85 to 97.5 wt. % of tungsten powder and, optionally, at least one member selected from the group consisting of steel, brass, copper, aluminum, nickel, silver, zinc, iron oxide, copper oxide, aluminum oxide, barium sulfate, zinc oxide and molybdenum sulfide.

* * * * *